United States Patent
Crump

(10) Patent No.: US 7,363,286 B2
(45) Date of Patent: Apr. 22, 2008

(54) FILE SYSTEM PATH ALIAS

(75) Inventor: Michael William Crump, Palm Springs, CA (US)

(73) Assignee: International Business Machines Corporation, Armonk, NY (US)

(*) Notice: Subject to any disclaimer, the term of this patent is extended or adjusted under 35 U.S.C. 154(b) by 906 days.

(21) Appl. No.: 10/282,544

(22) Filed: Oct. 29, 2002

(65) Prior Publication Data
US 2003/0101277 A1 May 29, 2003

Related U.S. Application Data

(60) Provisional application No. 60/350,484, filed on Oct. 29, 2001.

(51) Int. Cl.
*G06F 17/30* (2006.01)
(52) U.S. Cl. .............. 707/2; 707/10; 709/203; 709/223
(58) Field of Classification Search ............ 707/2, 707/1, 9, 4, 10; 709/217, 226, 203, 223
See application file for complete search history.

(56) References Cited

U.S. PATENT DOCUMENTS

| | | | |
|---|---|---|---|
| 4,423,414 A | 12/1983 | Bryant et al. | |
| 4,718,005 A | 1/1988 | Feigenbaum et al. | |
| 4,825,354 A | 4/1989 | Agrawal et al. | |
| 5,706,501 A | 1/1998 | Horikiri et al. | |
| 5,745,888 A * | 4/1998 | Bauer et al. | 707/1 |
| 5,751,961 A | 5/1998 | Smyk | |
| 5,764,906 A | 6/1998 | Edelstein et al. | |
| 5,923,878 A * | 7/1999 | Marsland | 717/139 |
| 6,044,367 A * | 3/2000 | Wolff | 707/2 |
| 6,049,835 A | 4/2000 | Gagnon | |
| 6,067,545 A * | 5/2000 | Wolff | 707/10 |
| 6,101,508 A * | 8/2000 | Wolff | 709/223 |
| 6,101,537 A | 8/2000 | Edelstein et al. | |
| 6,185,601 B1 * | 2/2001 | Wolff | 709/203 |
| 6,195,707 B1 | 2/2001 | Minh | |
| 6,216,162 B1 * | 4/2001 | Dutcher et al. | 707/226 |
| 6,272,523 B1 | 8/2001 | Factor | |
| 6,311,219 B1 | 10/2001 | Factor | |
| 6,411,986 B1 * | 6/2002 | Susai et al. | 709/203 |
| 6,418,466 B1 * | 7/2002 | Bertram et al. | 709/221 |
| 6,510,450 B1 * | 1/2003 | Ricart et al. | 709/203 |
| 6,654,794 B1 * | 11/2003 | French | 709/217 |
| 6,728,716 B1 * | 4/2004 | Bhattacharya et al. | 707/10 |
| 6,856,989 B1 * | 2/2005 | Zhou et al. | 707/9 |
| 2002/0169767 A1 * | 11/2002 | Harvey | 707/4 |

* cited by examiner

*Primary Examiner*—Don Wong
*Assistant Examiner*—Sheree N Brown
(74) *Attorney, Agent, or Firm*—Gates & Coooper LLP

(57) ABSTRACT

A method, apparatus, and article of manufacture provide the ability to perform an operation on a multi-platform heterogeneous network. Path alias table (PAT) information necessary to create a PAT is obtained by a server. The PAT information includes alias(es) and location information necessary to locate a desired path for the alias(es). The server resolves the alias(es) using the PAT information by finding the desired path for the alias(es) within the file system of the server, building the PAT, and storing the PAT in a memory on the server. A request for an operation (comprising an alias) is received from a client. The PAT is then examined for the alias. Once found, the requested operation is performed using the desired path that corresponds to the alias in the PAT.

30 Claims, 2 Drawing Sheets

FILE SYSTEM PATH ALIAS

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 60/350,484, filed Oct. 29, 2001, by Michael William Crump, entitled "Advanced Client/Server Functionality."

BACKGROUND OF THE INVENTION

1. Field of the Invention

The present invention relates generally to file systems, and in particular, to a method, apparatus, and article of manufacture for solving the difficulty incurred by a program on one computer (the client) being completely reliant on the internal file structure of another computer (the server) in order to access the server's files.

2. Description of the Related Art

Computer use has proliferated and continues to expand as technological capabilities rapidly increase. With this proliferation, the development and use of different computers running different types of operating system having different internal file systems has also increased. In a network environment, the different computers may attempt to communicate with each other including transmitting/receiving information and services to/from each other. However, when a computer program attempts to access a file on any other particular computer, the computer program is subjected to the quirks of the file system upon that computer. This includes the fact that the program trying to access the file needs to know both the name of the file, and where the file actually resides internally on the computer. Such information may not be known or may be difficult or impossible to learn and/or use. Accordingly, a method is needed for accessing information on files without knowledge of a computer's underlying file structure. These problems may be better understood by describing prior art file systems and network communications.

Depending on the type of operating system a computer is executing, the internal file system varies considerably. For example, if a computer is running the Windows™ operating system, the file system may be composed of one or more drives; either local within the computer or logically mapped to a network connection. Each drive is assigned a letter, starting from C (A and B are reserved) and ending at Z, followed by a colon (:) character. Within a given drive exists a hierarchical directory structure, using variable length names and the backward slash (\) character to indicate a level in the hierarchy. Examples of a hierarchical directory structure in the Windows operating system include those illustrated in Table 1:

TABLE 1

| | |
|---|---|
| C:\Temp | A directory name called Temp located on the C drive. |
| C:\Temp\Fred | A directory called Temp further containing a sub-directory called Fred. |
| C:\Temp\Fred\file.txt | A file residing in the Fred sub-directory of the Temp directory. |

If a computer is running the UNDX™ operating system, the file system is composed of one or more "mount" points; either local within the computer or logically mapped to a network connection. Each mount point is assigned a name, and is referenced using two forward slashes (//). Within a given mount point exists a hierarchical directory structure, using variable length names and the forward slash (/) character to indicate a level in the hierarchy. Examples of a hierarchical directory structure in the UNIX™ operating system include those in Table 2:

TABLE 2

| | |
|---|---|
| //Temp | A directory name called Temp located on the default mount point. |
| //Temp/Fred | A directory called Temp further containing a sub-directory called Fred. |
| //Temp/Fred/file.txt | A file residing in the Fred sub-directory of the Temp directory. |

If a computer is running the OS/390™ operating system, the file system is composed of one or more high-level prefix names that are controlled by a central catalog. Beneath the high level prefix lies one or more 1 to 8 character names, separated by a period (.) character, with a total length not exceeding 44 characters.

The combination of high-level prefix and the period-delimited suffix is called a "dataset name". There are many types of datasets on OS/390. Each of the datasets further complicates the indicated format. One of the more common datasets is called a Partition Dataset or PDS. A PDS may contain one ore more files, indicated by use of open and close parentheses ( ). Examples of a hierarchical data structure in the OS/390 operating system include those illustrated in Table 3:

TABLE 3

| | |
|---|---|
| HILEV.temp.fred.File | A dataset containing many files. |
| HILEV.temp.fred.File(txt) | A dataset name called HILEV.temp.fred.file containing a file called txt. |

The details of the file systems are not necessary for understanding the present invention. However, it should be recognized that the file systems are all different. In this regard, a computer program trying to access a file on any particular computer is subjected to the quirks and details of the file system upon that computer. Such details include the fact that the program trying to access the file needs to know both the name of the file, and where the file actually resides internally on the other computer.

The prior art necessity for knowledge of the file system details may be illustrated by the following example. Assume three different computers (servers) are communicating: one running OS/390, one running Windows™, and the third one running UNIX. Each server houses a copy of a file. In each case, the file is the same in the sense that its content is identical. It is only the file system upon which the file resides that varies from one machine to the next.

A fourth computer, acting as a client, wishes to retrieve this file from any server. The client does not care which server it retrieves the file from, since the file will be the same no matter which server handles the request. Thus when the client connects with the server, it wishes to merely "ask for the file" without the need to care about the server's file system. To paraphrase in English, the client request may be "Excuse me server, could you please give me file X?" as distinct from "Excuse me server, could you please give me file X which you have located in quadrant Y of partition Z on drive Q?"

When considering the second request above, it should be clear that the client would not know that this particular server uses the term "quadrant" while a different server may use the term "directory" while the third server may use the term "fandangle". Furthermore, even if the client could be made to be completely sensitive to the server's file system and know the proper form for requesting a file (e.g., the client speaks in the vocabulary of the server), the client would not know where the file actually was located. In other words, the client request may be "Excuse me server number 2, I speak your language, so could you please refer to drive C, directory Alpha, delimiter '\', sub-directory Beta, and send me a copy of file X?" In response, the server may return the file to the client. However, to personify the server with human emotion, the server may respond: "Hello Client, yes here is file X, but how did you know where I had it located?"

In view of the above, it may be understood that a program trying to access a file in the prior art needs to know both the name of the file and where the file actually resides internally on the other computer. Gaining and maintaining such knowledge is problematic.

SUMMARY OF THE INVENTION

Operating and file systems being utilized vary across computers in a network. To perform desired operations on a foreign computer (a server), each computer (client) must maintain knowledge of the server computer's file structure and operating system. One or more embodiments of the invention solve the difficulty incurred by a program on the client computer being completely reliant on the internal file system structure of the server computer in order to access its files.

The server uses an external definition file to build a table of globally agreed upon alias names. This table is referred to as the Path Alias Table or PAT. The PAT definition file information includes the arguments necessary for the server to scan its own file system, locate the desired paths, append sub-directories if necessary, and record the relationship between the desired path and alias internally in the PAT. Once the PAT has been created, the client merely specifies a desired operation and an alias name for the location. In this regard, the client does not need to specify the actual path for the operation. By only specifying the alias name, the client does not need to learn or maintain any knowledge regarding the file structure or operating system of the server.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
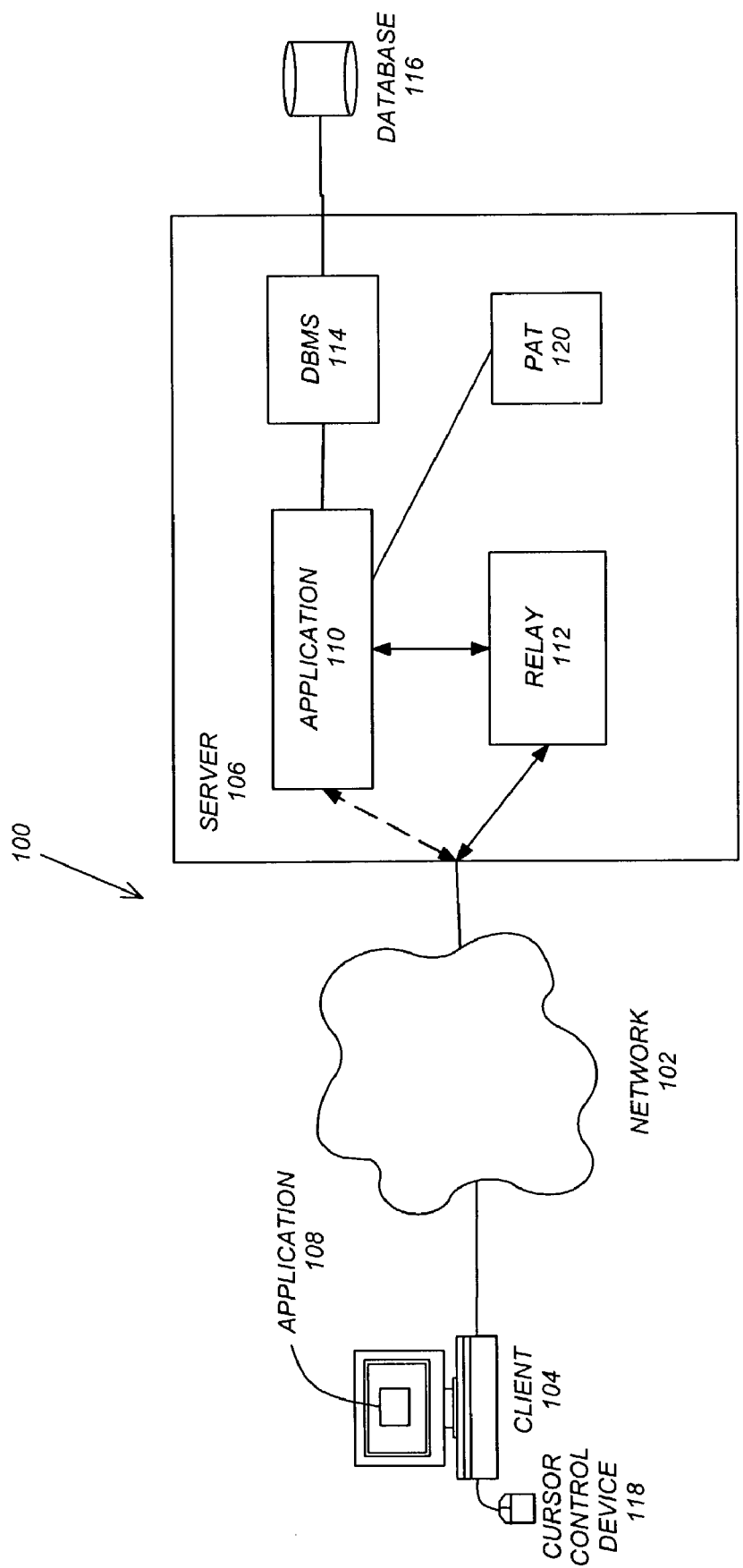
FIG. 1 schematically illustrates a hardware and software environment in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention allow a client to be completely independent of the file system of the server, yet still be able to retrieve a list (e.g., directory list) and access files on the server. Such actions include both retrieving (GET) and sending (PUT) files.

Client requests to the server may come in the form of a two-part statement:
(1) the name of the file in question
(2) an alias name.

The alias name is known to both the client and the server and is file system independent. For example, assume the following alias names are used: DOWNLOADUNIXFIXES and DOWNLOADWINPRODUCTS. To paraphrase in English, the first alias refers to the location where software fixes for the UNIX platform have been downloaded, and the second alias refers to the location where software products for the Windows platform have been downloaded. A client may desire to retrieve "file X" in DOWNLOADUNIX-FIXES. To paraphrase in English, the request may comprise:

'Excuse me server, could you please give me file X from the place where you keep your UNIX fixes that are downloaded from the web, because I, the client, neither know what kind of file system you have, nor do I care where it is you actually put things.'

The Path Alias Table (PAT) resides in memory inside the server. The PAT is the key to the file access process, and enables clients to make requests using an alias name. The PAT contains a mapping such that the alias is mapped to a particular location within the server's file system. Once the alias name is received from the client, the alias name is used in a "look-up" process (i.e., using the PAT) by the server. Once the alias name is found, the server uses an associated internal locator to access the file from the location identified in the PAT. The PAT is very much like a translation dictionary, allowing the client to use a common language, and the servers to assign their own internal peculiarities to the equivalent translation.

To perform this "look-up" process, the PAT must first be created on server. When the server is first started, it reads in an external PAT Definition file (referred to as PAT information) necessary to create the PAT. The PAT information provides information relevant to the server's particular file and operating system. The server resolves each alias name in the PAT information by finding the appropriate location within the server's file system, and building the PAT as a mapping/translation dictionary. Accordingly, the PAT contains a list of aliases and server specific path information for each alias. When this has been completed, the server may then accept file requests from clients.

Use of a "Path Alias" allows a client to remain completely independent of the file system of the machine upon which the server is running, yet still request listings of, and retrieve files from the server. This is crucial since the server can run on OS/390™, Windows™, and various flavors of UNIX™, where the file systems are quite different.

General Hardware and Software Environment

FIG. 1 schematically illustrates a hardware and software environment in accordance with one or more embodiments of the invention, and more particularly, illustrates a typical distributed computer system 100 using a network 102 to connect client computers 104 to server computers 106. A typical combination of resources may include a network 102 comprising the Internet, local area networks (LANs), wide-area networks (WANs), systems network architecture (SNA) networks, or the like, clients 104 that are personal computers or workstations, and servers 106 that are personal computers, workstations, minicomputers, or mainframes. Additionally, both client 104 and server 106 may receive input (e.g., cursor location input) and display a cursor in response to an input device such as cursor control device 118.

A network 102 connects clients 104 to server computers 106. Clients 104 may execute a client application 108 under an operating system such as Windows™, UNIX™, OS/390™, and/or LINUX™. The client 104 communicates with server computers 106 executing a server application 110 under an operating system such as Windows™, UNIX™, LINUX™, and OS/390™.

In one or more embodiments of the invention, the client application 108 and server application 110 may be part of a suite of software such as CIRCUIT™ (Centralized Installation, Replication, and Configuration Using Internet Technology) available from Candle Corporation. Such a software suite may provide many features. For example, between the client 104 and the server 106, the software suite may inquire upon, retrieve, and install software that resides on the server 106, after having first been downloaded from a web site (e.g., on another server 106). Accordingly, the server 106 may act as a software repository for various products and maintenance, and the clients 104 permit the end-user to retrieve their desired software from the platform of choice.

The software suite may also use an extra component 112 in addition to other components (i.e., in addition to client application 108 or server application 110). This extra component 112 may download the software from a web site and may be referred to as the Relay 112 since it may act as the interface between a customer's multi-platform environment (e.g., network 102 and multiple clients 104) and a web environment (e.g., a server application 110 and any web support that may be available on a server 106). The component 112 may reside on the same machine (referred to as "the download box") as the server 106. However, there is no requirement in the invention for the server 106 to be web enabled, accessible via the Internet, or be able to interpret Uniform Resource Locators (URLs). Accordingly, the server 106 may not employ web pages, web engines, or bookmarks, and can therefore reside and operate on a machine that has no web capability. Further, there is no requirement for the client 104 to be a human being using a web browser, or for the client 106 to be a program emulating a web browser. Also, there is no requirement for a client program 108 to employ HTTP (hyper text transfer protocol), HTTPS (hyper text transfer protocol secure), LAP (link access protocol), or any additional functionality beyond the basic functions of simple TCP/IP (transmission control protocol/internet protocol) connectivity.

The Relay 112 may operate in bi-directional mode, performing both downloads into the software suite (e.g., into server 106 or client 104 from a web site), and uploads into a web environment. However, one or more embodiments may only offer download capability.

The Relay 112 may also use HTTP for communication with a web site. Clients 104 and servers 106 may use TCP/IP connectivity for all data interchange. SNA (systems network architecture) may (or may not) be supported for various reasons. Some or all data transfers between client 104 and server 106 may be accomplished using TCP/IP Sockets and an appropriate exchange protocol. Further, such a configuration may eliminate the need for File Transfer Protocol (FTP).

In addition to the use of Relay 112 on server 106, an application 110 on server 110 may manipulate data in database 116 through a database management system (DBMS) 114. For example, the software repository may be stored in database 116. Alternatively, database 116 may be part of or connected directly to client 104 instead of communicating/obtaining the information from database 116 across network 102.

Further, server 106 maintains and owns a table of globally agreed upon alias names, referred to as the path alias table (PAT) 120. In this regard, no other managed servers 106, birth computer, logical location servers, or any other server machines are involved in the normal operation of equating an alias to a location in the server's 106 file system environment. Accordingly, the PAT 120, its associations, its operations, and its entire configuration reside on server 106 and not client 104. There is no file, or configuration, or any alias maintenance on the client 104. Alterations to the PAT 120 require no changes to client 104, no synchronization across a network 102, no update to a location service, nor any communication by server 106 with any other machine.

Server 106 and PAT 120 may operate on an Extended Binary Coded Decimal Interchange code (EBCDIC) operating systems such as OS/390, VM/ESA (Virtual Machine Enterprise Systems Architecture), and OS/400. The EBCDIC is an 8-bit translation scheme that allows all 8 bits of a byte to be used to represent values from 00 to 255. File contents ate interpreted by this rule. Server 106 and PAT 120 may also operate on the American Standard Code for Information Interchange (ASCII) operating system such as Windows, UNIX, and LINUX. ASCII is a 7-bit translation scheme that allows only 7 of 8 bits of a byte to be used to represent values from 00 to 127. File contents are interpreted by this rule. When either an ASCII or EBCDIC operating system are utilized, the intricacies of the operating system are never exposed to the client 104.

Additionally, an EBCDIC server 106 (such as an OS/390 or VM/ESA) and its PAT 120 support Physical Sequential (PS), Partitioned Organization (PO) and Virtual System Access Method (VSAM) files. An ASCII server 106 (such as Windows or UNIX) support File Access Table (FAT/FAT32), High Performance File System (HPFS), and Network File System (NTFS) files. Once again, when either the ASCII or EBCDIC operating system is used, the intricacies of the file system are never exposed to the client 104.

Generally, these components 108-120 all comprise logic and/or data that is embodied in or retrievable from a device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Details of Software Embodiments

As described above, the server 106 has a table of globally agreed upon Alias Names referred to as the Path Alias Table or PAT 120. To create the PAT 120, PAT information provides the server with the arguments necessary for the server 106 to scan its own file system, locate the desired paths, append sub-directories if necessary, and record the relationship internally. This internal relationship is established in the form of the PAT that may be viewed as a mapping or translation dictionary. Thereafter, if a client 104 requests a list of the contents of a certain directory, it specifies the alias name and not the actual path (which can be retrieved from the PAT). An example would be an alias of CANDLEHOME which the client 104 knows will contain products, but wouldn't know where on the server 106 machine the products might actually reside.

Furthermore, by interfacing with the Network 102 (e.g. Windows NTFS) it is possible for the server 106 to have an alias for a path to a different machine altogether. This permits a client 104 to request a server 106 for information off a second server 106, without ever specifying the second server's 106 name.

Table 4 is an example of a Windows PAT information file used to build a PAT in accordance with on or more embodiments of the invention.

TABLE 4

```
*    ================
*    LOCAL DIRECTORY
*    ================
PATH:CWD            TYPE:LOCAL    DOMAIN:CWD              DRIVE:ANY    PATHDIR:
PATH:TEMP           TYPE:ALIAS    DOMAIN:CWD              DRIVE:NONE   PATHDIR:TEMP
PATH:LOGS           TYPE:ALIAS    DOMAIN.CWD              DRIVE:NONE   PATHDIR:LOGS
PATH:SYSTEMTEMP     TYPE:LOCAL    DOMAIN:NONE             DRIVE:ANY    PATHDIR:TEMP
*    ================
*    CONNECTED SERVERS
*    ================
PATH:WINSERVER      TYPE:NTFS     DOMAIN:\\HQA04\BPI      DRIVE:ANY    PATHDIR:
PATH:ALTSERVER      TYPE:NTFS     DOMAIN:\\PNTIBG2\Ddrive DRIVE:ANY    PATHDIR:
*    ================
*    PACKAGING DIRECTORIES ON SERVER
*    ================
PATH:CDINPUT            TYPE:ALIAS    DOMAIN:WINSERVER    DRIVE:NONE
    PATHDIR:CDINPUT
PATH:CDOUTPUT           TYPE:ALIAS    DOMAIN:WINSERVER    DRIVE:NONE
    PATHDIR:CDOUTPUT
PATH:PACKAGE            TYPE:ALIAS    DOMAIN:WINSERVER    DRIVE:NONE
    PATHDIR:PACKAGE
PATH:WINPROMOTE         TYPE:ALIAS    DOMAIN:WINSERVER    DRIVE:NONE
    PATHDIR:EDELIVERY
PATH:WINPROTABLES       TYPE:ALIAS    DOMAIN:WINPROMOTE   DRIVE:NONE
    PATHDIR:Etables
PATH:WINPROSEGMENTS     TYPE:ALIAS    DOMAIN:WINPROMOTE   DRIVE:NONE
    PATHDIR:Segments
*    ================
*    E-DELIVERY DIRECTORIES ON SERVER
*    ================
PATH:ETABLES            TYPE:ALIAS    DOMAIN:ALTSERVER    DRIVE:
    PATHDIR:EdeliveryMerge
PATH:MVSETABLES         TYPE:ALIAS    DOMAIN:ETABLES      DRIVE:
    PATHIDIR:OS390
PATH:WINETABLES         TYPE:ALIAS    DOMAIN:ETABLES      DRIVE:
    PATHDIR:WINDOWS
PATH:UNIXETABLES        TYPE:ALIAS    DOMAIN:ETABLES      DRIVE:
    PATHDIR:UNIX
PATH:LOADETABLES        TYPE:ALIAS    DOMAIN:ALTSERVER    DRIVE:
    PATHDIR:EdeliveryLoad
PATH:LOADGLOBAL         TYPE:ALIAS    DOMAIN:LOADETABLES  DRIVE:
    PATHDIR:GLOBAL
PATH:LOADDOMAINS        TYPE:ALIAS    DOMAIN:LOADETABLES  DRIVE:
    PATHDIR:DOMAINS
PATH:LOADFIXES          TYPE:ALIAS    DOMAIN:LOADETABLES  DRIVE:
    PATHDIR:DOMAINS
PATH:LOADSEGMENTS       TYPE:ALIAS    DOMAIN:LOADETABLES  DRIVE:
    PATHDIR:SEGMENTS
PATH:LOADCONTROL        TYPE:ALIAS    DOMAIN:LOADETABLES  DRIVE:
    PATHDIR:CTL
*    ================
```

Explanation of Path Alias Table (Table 4)

During initialization, the server 106 will scan the above PAT Information for two kinds of alias types—LOCAL and NTFS. All local aliases are resolved by scanning local hard drives on the machine. All NTFS or network aliases are resolved by scanning all network-attached logical drives. Once all LOCAL and NTFS aliases have been resolved, all ALIAS definitions will have been resolved.

As illustrated in the PAT information of Table 4, a basic alias can refer to either a local drive or a network domain.

Such local drives can be specified as "ANY" (meaning all local drives) or a specific drive letter (e.g. "C:" or "D:"). Network drives can be specified as "ANY" (meaning all existing logically mapped drives) or a specific drive letter (e.g. "Y:" or "Z:"). When resolving the PAT Information, if no matches are found, a new network mapping is established to the server 106.

A secondary alias is one that refers to another alias. A secondary alias is resolved using the path first resolved for the first alias. Resolving a secondary alias in this manner provides a more simplistic and efficient method during initialization, especially for network aliases.

Using the PAT Information of Table 4, the PAT 120 of Table 5 may be established and recorded in the memory of the server 106:

resolution process, these network aliases are mapped to the "O:" and "Z:" drives respectively.

The remaining aliases specify any mapped alias, local directory, or connected server as the domain. When a prior alias, local directory, or connected server is specified as the domain, the prior mapping is utilized as a starting point and the specified PATHDIR is appended to the prior mapping to create the mapping for the alias.

Accordingly, the Packaging Directories and E-Delivery Directories build upon the prior mappings and/or aliases. For example, the CDINPUT alias specifies the WIN-SERVER domain with a subdirectory of CDINPUT. In this regard, the CDINPUT alias maps to the drive for WIN-SERVER—"O:" with a subdirectory of CDINPUT (i.e., the PATHDIR specified in Table 4) thereby creating a mapping

TABLE 5

| | |
|---|---|
| CWD | C:\Circuit if that is where the server 106 is actually running |
| TEMP | C:\Circuit\Temp |
| LOGS | C:\Circuit\Logs |
| SYSTEMTEMP | C:\TEMP or maybe D:\TEMP |
| WINSERVER | O:\\HQA04\\BPI using the pre-existing O: drive mapping |
| ALTSERVER | Z:\\PNTIBG2\\Ddrive new Z: drive because server was not already mapped. |
| CDINPUT | O:\CDINPUT |
| CDOUTPUT | O:\CDOUTPUT |
| PACKAGE | O:\PACKAGE |
| WINPROMOTE | O:\Edelivery |
| WINPROTABLES | O:\Edelivery\Etables |
| WINPROSEGMENTS | O:\Edelivery\Segments |
| ETABLES | Z:\EdeliveryMerge |
| WINETABLES | Z:\EdeliveryMerge\Windows |
| MVSETABLES | Z:\EdeliveryMerge\OS390 |
| UNIXETABLES | Z:\EdeliveryMerge\UNIX |
| LOADETABLES | Z:\EdeliveryLoad |
| LOADGLOBAL | Z:\EdeliveryLoad\Global |
| LOADDOMAINS | Z:\EdeliveryLoad\Domains |

As illustrated in Table 5, the PAT 120 provides the alias name followed by a location corresponding to the alias. Referring to Tables 4 and 5, the CWD alias is an alias for a subdirectory "Circuit" on the local "C:" drive. Similarly, the SYSTEMTEMP alias is an alias for a location on the local "C:" drive at the TEMP subdirectory. TEMP and LOGS are aliases for a location on the CWD domain (i.e., wherever the CWD domain is mapped to). Thus, since CWD is mapped to C:\Circuit, the TEMP and LOGS aliases are subdirectories within C:\Circuit.

Table 4 indicates that the connected servers 106 (i.e., WINSERVER and ALTSERVER) are network 102 servers (i.e., NTFS) located at the specified domains. During the to "O:\CDINPUT." Similarly, the WINPROTABLES alias specifies the WINPROMOTE domain with a subdirectory of ETables. In this regard, the WINPROMOTE alias utilizes the prior mapping for WINPROTABLES (i.e., O:\EDelivery) and appends the specified path directory (i.e., ETables) to create the mapping "O:\EDelivery\ETables."

When the server 106 is initialized, the PAT Information is resolved to create the PAT such that the particular location is mapped to each alias.

Table 6 is an example of a UNIX PAT information file used to build a PAT in accordance with on or more embodiments of the invention.

TABLE 6

| | | | | |
|---|---|---|---|---|
| *  =============== | | | | |
| *  LOCAL DIRECTORY | | | | |
| *  =============== | | | | |
| PATH:CWD | TYPE:LOCAL | DOMAIN:CWD | DRIVE:ANY | PATHDIR: |
| PATH:HOME | TYPE:ALIAS | DOMAIN:CWD | DRIVE:NONE | PATHDIR |
| PATH:TEMP | TYPE:ALIAS | DOMAIN:CWD | DRIVE:NONE | PATHDIR:TEMP |
| PATH:LOGS | TYPE:ALIAS | DOMAIN:CWD | DRIVE:NONE | PATHDIR:LOGS |
| *  =============== | | | | |
| *  SOFTWARE DOWNLOAD DIRECTORIES | | | | |
| *  =============== | | | | |
| PATH:PRODUCT | TYPE:ALIAS | DOMAIN:HOME | DRIVE:NONE | PATHDIR:Prod |
| PATH:SERVICE | TYPE:ALIAS | DOMAIN:HOME | DRIVE:NONE | PATHDIR:Pac |
| PATH:FIXES | TYPE:ALIAS | DOMAIN:HOME | DRIVE:NONE | PATHDIR:Fix |
| *  =============== | | | | |

TABLE 6-continued

```
*    INSTALLATION DIRECTORIES
*    ===============
PATH:CANDLEHOME    TYPE:LOCAL   DOMAIN:NONE DRIVE:ANY   PATHDIR:Candle
PATH:OMEGINSTALL   TYPE:ALIAS   DOMAIN:CANDLEHOME       PATHDIR:Omegamon
PATH:EBPINSTALL    TYPE:ALIAS   DOMAIN:CANDLEHOME       PATHDIR:Roma
PATH:MQSINSTALL    TYPE:ALIAS   DOMAIN:CANDLEHOME       PATHDIR:MQSecure
*    ===============
```

As illustrated in the PAT information of Table 6, a client can have access to both downloaded software, and installed products, without any knowledge of the UNIX file system, or the actual location of either the downloaded software or the installed products. A simple listing of the Alias OMEGINSTALL returns the list of various OMEGAMON products installed on the server. Similarly, a listing of the Alias FIXES might return a list of downloaded fixes eligible for installation to any of the OMEGAMON products.

Table 7 is an example of an OS/390 PAT information file used to build a PAT in accordance with on or more embodiments of the invention.

TABLE 7

```
*    ===============
*    LOCAL ENVIRONMENT
*    ===============
PATH:CIRCUIT     TYPE:LOCAL   DOMAIN:NONE      PATHDIR:SYS1.CIRCUIT
PATH:TEMP        TYPE:ALIAS   DOMAIN:CIRCUIT   PATHDIR:TEMP
PATH:LOGS        TYPE:ALIAS   DOMAIN:CIRCUIT   PATHIDIR:LOGS
PATH:CONFIG      TYPE:ALIAS   DOMAIN:CIRCUIT   PATHDIR:CFG
PATH:EMAIL       TYPE:ALIAS   DOMAIN:CIRCUIT   PATHDIR:EMAIL
*    ===============
*    INTERNET DELIVERED SOFTWARE
*    ===============
PATH:RETRIEVE    TYPE:ALIAS   DOMAIN:CIRCUIT   PATHDIR.RETRIEVE
PATH:PREPARE     TYPE:ALIAS   DOMAIN:CIRCUIT   PATHDIR.PREPARE
*    ===============
*    DEVELOPMENT ENVIRONMENT
*    ===============
PATH:TSOPROD     TYPE:LOCAL   DOMAIN:NONE      PATHDIR:SYS1.TSO
PATH:TSODEV      TYPE:LOCAL   DOMAIN:NONE      PATHDIR:SYSDEV.TSO
PATH:PRODISPF    TYPE:ALIAS   DOMAIN:TSOPROD   PATHDIR:ISPF
PATH:PRODPNLS    TYPE:ALIAS   DOMAIN:PRODISPF  PATHDIR:PANELS
PATH:PRODCMD     TYPE:ALIAS   DOMAIN:TSOPROD   PATHDIR:CLIST
PATH:DEVISPF     TYPE:ALIAS   DOMAIN:TSODEV    PATHDIR:ISPF
PATH:DEVPNLS     TYPE:ALIAS   DOMAIN:DEVISPF   PATHDIR:PANELS
PATH:DEVCMD      TYPE:ALIAS   DOMAIN:TSODEV    PATHDIR:CLIST
*    ===============
```

As illustrated in the PAT information of Table 7, a client can issue the following calls and achieve the following results:
1. Alias CIRCUIT returns a list of the datasets that match SYS1.CIRCUIT.*.
2. Alias LOGS returns a list of the members in SYS1.CIRCUIT.LOGS.
3. Alias PRODISPF returns a list of the datasets that match SYS1.TSO.ISPF.*.
4. Alias PRODPNLS returns a list of the members in SYS1.TSO.ISPF.PANELS.
5. Alias TSODEV returns a list of the datasets that match SYSDEV.TSO.*.
6. Alias DEVCMD returns a list of the members in SYSDEV.TSO.CLIST.

Example of Client Call with Alias Names

A client 104 may request a variety of operations using an alias. Such operations may include retrieving a file, sending a file, and/or specifying a program service for executing a particular service at the desired location. For example, a client application 108 may specify a program service request for a directory listing, including as its main argument the alias name SYSTEMTEMP. When the transaction is passed across the TCP/IP connection to the server 106, the request is interpreted and passed to a directory services portion of the server 106, which then scans the PAT 120 for the mapping. If the alias is found, then the actual path to which it is mapped is used to issue a directory listing. The results are then passed back to the client program 108, which may then elect to blindly display them to the end-user.

General Flow of Execution

Figure 2:
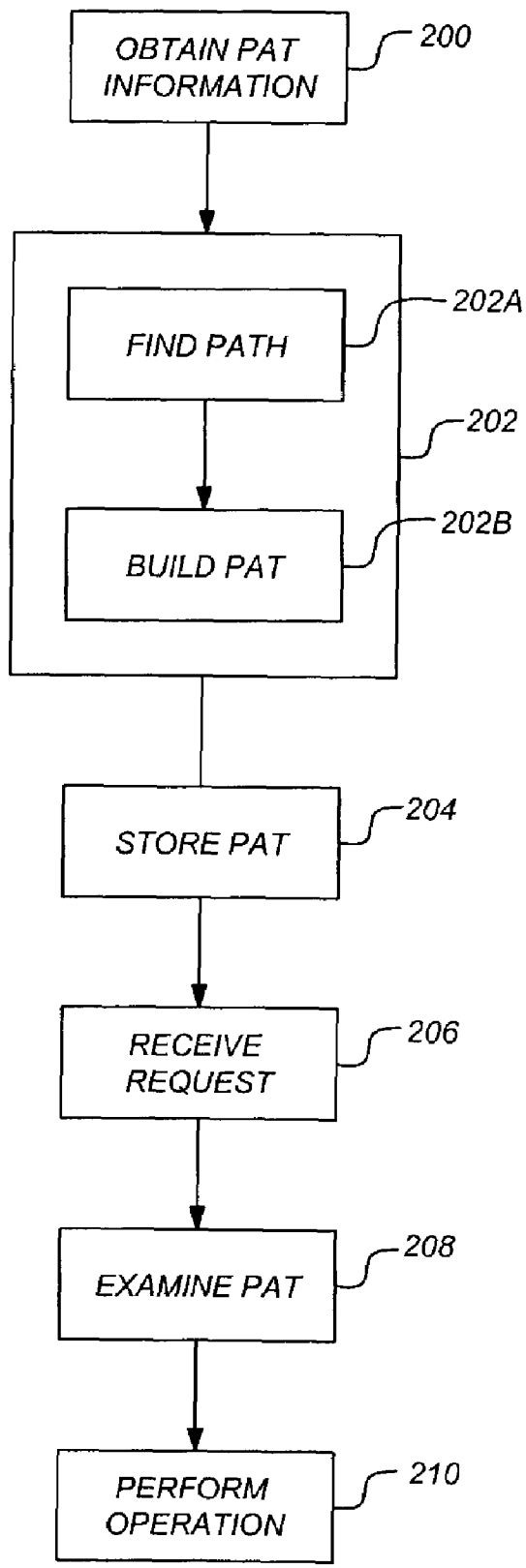
FIG. 2 is a flow chart illustrating the general flow of execution for the use of a PAT 120 in accordance with one or more embodiments of the invention.

FIG. 2 is a flow chart illustrating the general flow of execution for the use of a PAT 120 in accordance with one or more embodiments of the invention. At step 200, PAT information necessary to create a PAT 120 is obtained. As described above, such information comprises one or more aliases and location information necessary to locate a desired path for the one or more aliases. The PAT information may also include information necessary for the server 106 to scan its own file system, append a sub-directory to a desired path, and internally record a relationship between the alias and the desired path in a PAT. Specifically, the PAT information may include a path, a type, a domain, a drive, and a path directory. The PAT information provides instructions in a format useful to the particular file/operating system of the server 106.

At step 202, the one or more aliases in the PAT information are resolved (e.g., during initialization of the server 106). During the resolution process, the server 106 finds the desired path for the one or more aliases within the file system of the server at step 202A. At step 202B, the server 106 builds the PAT 120 that comprises the one or more aliases and the desired path for each alias.

At step 204, the PAT 120 is stored/recorded internally in the server 106 memory. It should be noted that the PAT information and the PAT may not be independent and separable but may be integrated together.

At step 206, a request for an operation is received in the server 106 from the client 104. As described above, in addition to the desired operation, the request comprises an alias name. By using the alias name (and not any additional location information), the client 104 may remain completely independent from the file system of the server 106. At step 208, the PAT 120 is examined for the alias received from the client 104.

At step 210, the requested operation is performed using the desired path that corresponds to the alias in the PAT 120. For example, the server 106 may perform a directory listing operation for the directory at the location identified by the alias. Any resulting information (e.g., a directory listing, a requested file, an indication of a successful store/send operation, etc.), may then be transmitted back to client 104.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

By using the PAT 120 as describe above, file operations to and from OS/390, VM/ESA, and OS/400 may be performed in the exact same manner as to and from Windows, UNIX, and LINUX. In all cases, the client 104 is oblivious of the nature of the operating or file system of the server 106. Further, the invention has no reliance on, or bearing on the web, web servers, web pages, web browsers, web engines, the Internet, Internet addresses or URLs. In this regard, the PAT 120 is intended for use by a client program 108 connected to a server program 110, to operate without need for user configuration or human intervention, to enable file interchange across a previously unknown, but dynamically discovered, multi-platform heterogeneous environment.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing an operation on a multi-platform heterogeneous network comprising:
  (a) obtaining path alias table (PAT) information necessary to create a PAT, wherein the PAT information comprises one or more aliases and location information necessary to locate a desired path for the one or more aliases;
  (b) resolving the one or more aliases using the PAT information by:
    (i) finding the desired path for the one or more aliases within a file system of a server; and
    (ii) building the PAT comprising the one or more aliases and the desired paths for each alias;
  (c) storing the PAT in a memory on the server;
  (d) receiving a request for an operation from a client, wherein:
    (i) the request comprises one of the aliases; and
    (ii) the server file system and the PAT are not exposed to the client;
  (e) examining the PAT for the one of the aliases received from the client in the request; and
  (f) performing the requested operation using the desired path that corresponds to the alias in the PAT.

2. The method of claim 1, wherein the PAT information further comprises information necessary for the server to scan its own file system.

3. The method of claim 1, wherein the PAT information further comprises information necessary to append a sub-directory to the desired path.

4. The method of claim 1, wherein the PAT information further comprises a path, a type, a domain, a drive, and a path directory.

5. The method of claim 1, wherein the server interfaces with the network such that the desired path is for a different machine on the network.

6. The method of claim 1, wherein the PAT operates on an extended binary coded decimal interchange code (EDCDIC) operating system.

7. The method of claim 1, wherein the PAT operates on an American Standard Code for Information Interchange (ASCII) operating system.

8. The method of claim 1, wherein one of the aliases comprises a secondary alias that refers to another alias.

9. The method of claim 1, wherein the operation comprises a request to retrieve a file at a location identified by the alias.

10. The method of claim 1, wherein the operation comprises a request to send a file to a location identified by the alias.

11. An apparatus for performing an operation on a multi-platform heterogeneous network comprising:
  (a) path alias table (PAT) information necessary to create a PAT, wherein the PAT information comprises one or more aliases and location information necessary to locate a desired path for the one or more aliases, wherein the PAT is not exposed to a client;
  (b) a server having a memory wherein the server is configured to:
    (i) resolve the one or more aliases using the PAT information by:
      (1) finding the desired path for the one or more aliases within a server file system, wherein the server file system is not exposed to the client; and
      (2) building a PAT comprising the one or more aliases and the desired paths for each alias;
    (iii) store the PAT in the memory;
    (iv) receive a request for an operation from the client, wherein the request comprises one of the aliases;
    (v) examine the PAT for the one of the aliases received from the client in the request; and
    (vi) perform the requested operation using the desired path that corresponds to the alias in the PAT.

12. The apparatus of claim 11, wherein the PAT information further comprises alias information necessary for the server to scan its own file system.

13. The apparatus of claim 11, wherein the PAT information further comprises alias information necessary to append a sub-directory to the desired path.

14. The apparatus of claim 11, wherein the PAT information further comprises a path, a type, a domain, a drive, and a path directory.

15. The apparatus of claim 11, wherein the server is further configured to interface with the network such that the desired path is for a different machine on the network.

16. The apparatus of claim 11, wherein the PAT operates on an extended binary coded decimal interchange code (EDCDIC) operating system.

17. The apparatus of claim 11, wherein the PAT operates on an American Standard Code for Information Interchange (ASCII) operating system.

18. The apparatus of claim 11, wherein one of the aliases comprises a secondary alias that refers to another alias.

19. The apparatus of claim 11, wherein the operation comprises a request to retrieve a file at a location identified by the alias.

20. The apparatus of claim 11, wherein the operation comprises a request to send a file to a location identified by the alias.

21. An article of manufacture comprising a program storage medium readable by a computer and embodying one or more instructions executable by the computer to perform a method for performing an operation on a multi-platform heterogeneous network, the method comprising:
   (a) obtaining path alias table (PAT) information necessary to create a PAT, wherein the PAT information comprises one or more aliases and location information necessary to locate a desired path for the one or more aliases;
   (b) resolving the one or more aliases using the PAT information by:
      (i) finding the desired path for the one or more aliases within a file system of a server; and
      (ii) building the PAT comprising the one or more aliases and the desired path for each alias;
   (c) storing the PAT in a memory on the server;
   (d) receiving a request for an operation from a client, wherein:
      (i) the request comprises one of the aliases; and
      (ii) the server file system and the PAT are not exposed to the client;
   (e) examining the PAT for the one of the aliases received from the client in the request; and
   (f) performing the requested operation using the desired path that corresponds to the alias in the PAT.

22. The article of manufacture of claim 21, wherein the PAT information further comprises alias information necessary for the server to scan its own file system.

23. The article of manufacture of claim 21, wherein the PAT information further comprises alias information necessary to append a sub-directory to the desired path.

24. The article of manufacture of claim 21, wherein the PAT information further comprises a path, a type, a domain, a drive, and a path directory.

25. The article of manufacture of claim 21, wherein the server interfaces with the network such that the desired path is for a different machine on the network.

26. The article of manufacture of claim 21, wherein the PAT operates on an extended binary coded decimal interchange code (EDCDIC) operating system.

27. The article of manufacture of claim 21, wherein the PAT operates on an American Standard Code for Information Interchange (ASCII) operating system.

28. The article of manufacture of claim 21, wherein one of the aliases comprises a secondary alias that refers to another alias.

29. The article of manufacture of claim 21, wherein the operation comprises a request to retrieve a file at a location identified by the alias.

30. The article of manufacture of claim 21, wherein the operation comprises a request to send a file to a location identified by the alias.

\* \* \* \* \*